(No Model.)
G. S. HILL.
AUTOMATIC STOP MECHANISM.
No. 541,276. Patented June 18, 1895.
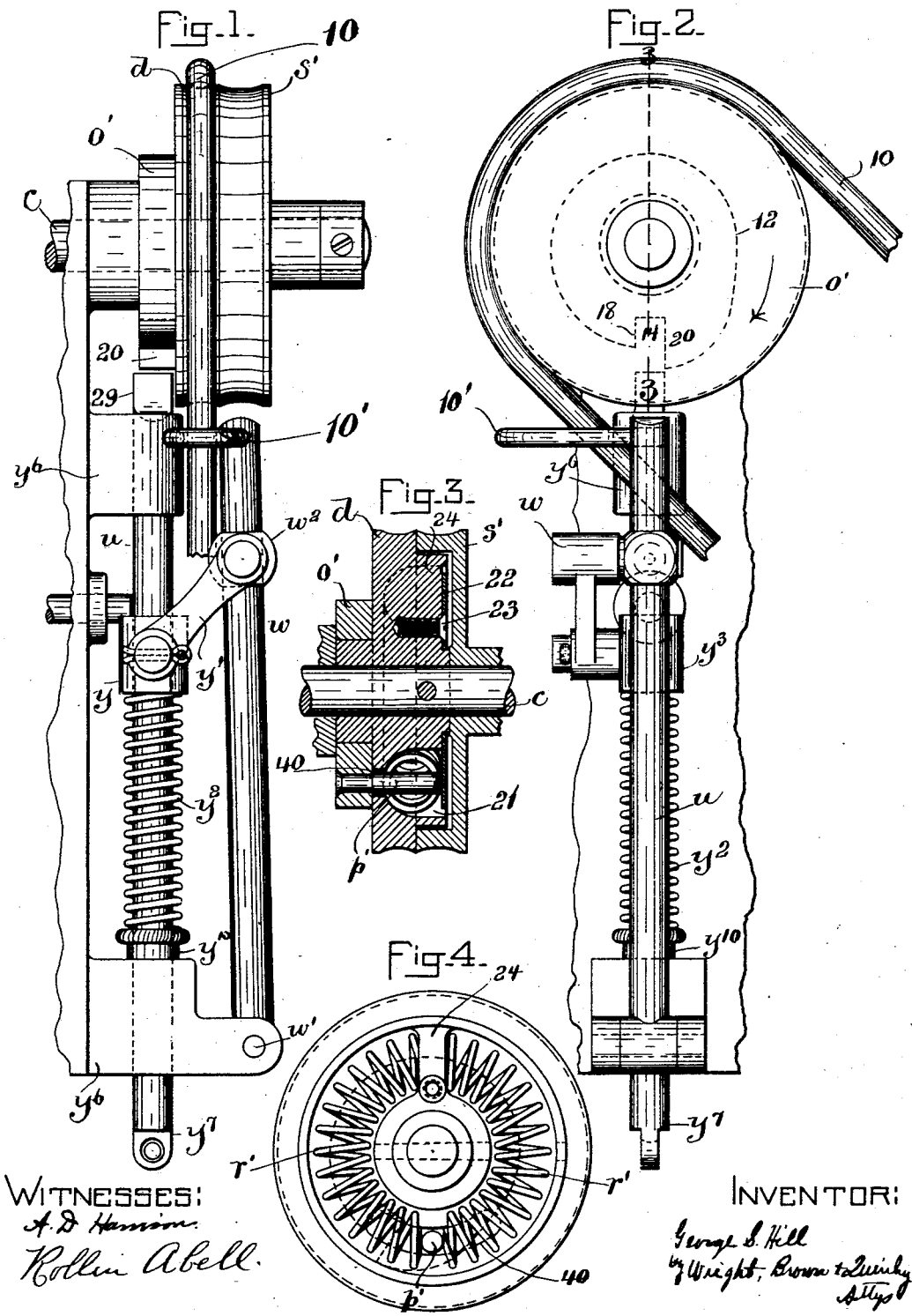
WITNESSES:
A. D. Harrison
Rollin Abell
INVENTOR:
George S. Hill
by Wright, Brown & Quinby
Attys

United States Patent Office.

GEORGE S. HILL, OF HAVERHILL, MASSACHUSETTS, ASSIGNOR OF ONE-HALF TO JAMES H. MURRAY, OF SAME PLACE.

AUTOMATIC STOP MECHANISM.

SPECIFICATION forming part of Letters Patent No. 541,276, dated June 18, 1895.

Original application filed February 27, 1894, Serial No. 501,700. Divided and this application filed August 24, 1894. Serial No. 521,170. (No model.)

*To all whom it may concern:*

Be it known that I, GEORGE S. HILL, of Haverhill, in the county of Essex and State of Massachusetts, have invented certain new and useful Improvements in Automatic Stop-Wheels and Belt-Shifting Devices for Sewing-Machines, of which the following is a specification.

This application is a division of my application for barring and tacking machines, filed February 27, 1894, Serial No. 501,700.

My invention relates to an improvement in automatic stop wheels and belt-shifting devices for sewing machines, and has for its object to provide means whereby a machine may be stopped at a predetermined time, and the belt shifted, by one operation, the means for stopping the machine and shifting the belt being united, and operating together.

My invention consists in certain novel features of construction and arrangement of parts which will be fully hereinafter described and particularly pointed out in the claims.

Reference is to be had to the accompanying drawings and the characters marked thereon, which form a part of this specification, like characters designating like parts or features, as the case may be, wherever they occur.

In the drawings, Figure 1 is a side view showing a portion of the main driving-shaft of the machine and my improved mechanism connected therewith. Fig. 2 is an end view of Fig. 1. Fig. 3 is a section on the line 3 3 of Fig. 2. Fig. 4 is a detail view of the springs and their arrangement located in the pulley $d$.

$d$ is a pulley rigidly mounted upon the main driving-shaft $c$. $s'$ is a loose pulley on said shaft, adjacent to the pulley $d$.

$o'$ is a cam-wheel mounted upon the shaft, adjacent to the pulley $d$ and on the side opposite to the pulley $s'$. This pulley ($s'$) is provided with a relatively broad periphery, as clearly shown in Fig. 1, so that when the belt is thrown from the fast to the loose pulley it can have considerable lateral movement on said loose pulley without being pushed off the edge of the same. Said cam-wheel is loose upon the main driving-shaft, and has a cam surface 12 provided with a recess 14, forming two projecting stops 18 and 20. The pulley $d$ is provided on its side next to the loose pulley with a circular chamber 21 having a partition 24. In this chamber are mounted two coiled springs $r'$, each having one end resting against said partition 24 and its other end engaging a pin $p'$ extending through a slot 40 in the pulley $d$ and secured to the cam-wheel. A plate 22 is secured over the chamber 21, by means of screws 23, in order to hold the springs in place.

$u$ is a sliding spring-pressed bolt mounted in lugs $y^6$ on the frame of the machine, having a head constructed and arranged to ride upon the cam surface 12 and be forced into the recess 14 by means of a spring $y^2$ mounted upon said bolt between two collars $y^3$ and $y^{10}$. The collar $y^{10}$ is loosely mounted upon said bolt, and rests upon the lower lug $y^6$. The collar $y^3$ is rigidly secured to said bolt at a suitable distance above the collar $y^{10}$, to give the spring $y^2$ the requisite amount of compression to produce the desired work.

$w$ is an arm pivoted at $w'$ to the outer end of the lug $y^6$ provided near its free end with a swiveled connection $w^2$. $y'$ is a link connecting the collar $y^3$ and said swiveled connection $w^2$.

10' is a loop secured to the free end of the pivoted arm $w$ and surrounding the driving-belt 10.

The bolt $u$ is connected at its lower end $y^7$ with a suitable device for pulling down the bolt and releasing the head 29 from its engagement with the recess 14.

To avoid breakage in the machine, which would occur if the parts were all rigidly mounted upon the driving-shaft $c$, I have provided the arrangement heretofore described, consisting of the springs $r'$ and the pin $p'$, the pin being free to play to a limited extent in the slot 40 of the pulley $d$.

The parts being constructed and arranged as described, the bolt $u$ having its head 29 in the recess 14, and the belt being upon the loose pulley $s'$, when it is desired to start the machine, the bolt $u$ is drawn down against the tension of the spring $y^2$. This operation releases the bolt from its engagement with the projections 18 and 20, and at the same time by means of the link $y'$ throws the belt upon the pulley $d$, starting said pulley. During the rotation of the pulley the bolt ($u$) is held down in any suitable way against the tension of the spring ($y^2$). When the bar is completed, which occurs when the shoulder 20 has passed the end 29 of the bolt, the bolt is released and rides upon the cam surface 12 until it reaches the low point on said cam surface near the place in Fig. 2 where the symbol 12 is located, when the bolt will have been forced up by the spring ($y^2$) sufficiently to operate through the link ($y'$) the belt-shipping attachment, and throw the belt on to the loose pulley. As the pulley ($d$) continues to rotate, the head 29 of the bolt continues to ride upon the cam surface 12, acting like a brake, the belt meanwhile being on the loose pulley. This action continues until the head 29 enters the recess 14 when said cam-wheel is positively stopped. The broadened surface of the pulley ($s'$) is provided to allow for the play of the belt after it has been shipped on to the loose pulley, and while the head 29 is riding upon the cam surface and before it enters the recess 14.

To compensate for the momentum of the machine and avoid breakage, I have arranged the springs heretofore described, so that the pulley $d$ can rotate to a limited extent after the belt is removed, and after the head 29 has entered the recess 14 one of the springs $r'$ in said pulley pressing against the pin $p'$ fixed upon the cam-wheel, thus providing a yielding resistance to the motion of the wheel, and securing a gradual stopping thereof and of the machine.

Having thus explained the nature of my invention and described a way of constructing and using the same, though without attempting to set forth all of the forms in which it may be made or all of the modes of its use, what I claim, and desire to secure by Letters Patent, is—

1. In a stop-mechanism for sewing machines, in combination, a main driving shaft, a pulley fast on said shaft, a wheel loose on said shaft provided with a notched peripheral cam surface and yieldingly connected to said pulley, means acting upon the periphery of said cam-wheel to first brake and then stop said wheel, and a belt-shipping mechanism connected to said means, substantially as and for the purpose set forth.

2. In a stop-mechanism for sewing machines, in combination, a main driving shaft, a pulley fast on said shaft, a cam-wheel on said shaft yieldingly connected to said pulley, a cam surface on said wheel having a recess, a sliding spring-pressed bolt arranged to have its end ride upon said cam surface and enter said recess, and a belt-shipping mechanism connected to said bolt, substantially as and for the purpose set forth.

3. In an automatic stop mechanism for sewing machines, in combination, a main driving-shaft; a pulley fast upon said shaft; a wheel loose upon said shaft and provided with a slot; a chamber in said pulley provided with a spiral spring; and a pin upon said wheel, passing through said slot and engaging said spring; a cam surface upon said wheel, having a recess; a sliding spring-pressed bolt, having a head arranged to ride upon said cam surface and engage said recess; and a belt-shifting device connected to said bolt, and arranged to be operated by said bolt; substantially as and for the purpose described.

In testimony whereof I have signed my name to this specification, in the presence of two subscribing witnesses, this 21st day of July, A. D. 1894.

GEORGE S. HILL.

Witnesses:
E. BATCHELDER,
A. D. HARRISON.